United States Patent
Noriyuki

(12) 
(10) Patent No.: US 6,510,159 B1
(45) Date of Patent: Jan. 21, 2003

(54) ROUTER AND ROUTING METHOD

(75) Inventor: Kameda Noriyuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/062,388

(22) Filed: Apr. 17, 1998

(30) Foreign Application Priority Data

Apr. 23, 1997 (JP) .............................................. 9-106014

(51) Int. Cl.[7] .......................... H04L 12/46; H04L 12/66
(52) U.S. Cl. ........................ 370/401; 370/466; 370/469
(58) Field of Search ................................ 370/401–405, 370/466, 467, 469

(56) References Cited

U.S. PATENT DOCUMENTS 5,600,644 A * 2/1997 Chang et al. ................ 370/404

FOREIGN PATENT DOCUMENTS

| JP | 63 196132 | 8/1988 |
| JP | 4-364625 | 12/1992 |
| JP | 6-152655 | 5/1994 |
| JP | 8-204746 | 8/1996 |

* cited by examiner

Primary Examiner—Melvin Marcelo
(74) Attorney, Agent, or Firm—Ostrolenk, Faber, Gerb & Soffen, LLP

(57) ABSTRACT

A route that can effectively transfer packets at a high speed when a virtual interface is used. The route operates in an ATM-LAN environment which implements RFC1577 "Classical IP and ARP over ATM" and has virtual interfaces. The route has an address table on which a set of a destination address of a network layer, an address of a next hop on a packet relay route, and packet transmission information is stored, retrieved, and removed as one entry. The address table stores as transmission information of a packet a destination address of a network layer and an address of a next hop at a packet transfer time, a header of a data link layer and a transmitted interface when a packet is transmitted to a LAN interface, and call information at an ATM when a packet is transmitted to an ATM interface. Packets are directly transmitted to a physical interface using the address table storing the packet transmitted from each interface, without executing a routing process.

10 Claims, 4 Drawing Sheets

ROUTER AND ROUTING METHOD

The present invention relates to a route that links networks, and more particularly to a route that transfers packets using a virtual interface (that links plural networks using a virtual channel on one ATM (Asynchronous Transfer Mode) physical interface). The present invention also relates to a routing method suitable for a route.

Conventionally, that type of routing method embodied in the route is used to reduce a table retrieving operation needed in the main routing process and to improve the table retrieval efficiency and the packet relaying capability. Such a routing method is disclosed in the JP-A-152655/1994. According to the prior art routing method, a local area network connected by a physical interface has an address table which can store a set of a destination address and a transmission address of a network layer as well as relay history information during a packet transfer operation (the header of a data link layer and a transmission destination interface). The speed of the relay process can be improved by storing various pieces of information into the address table at the time a first packet is transferred and then transferring following packets by using the address table, so that the main routing process can be omitted.

However, one problem of with the prior art routing method is that when the address of a next hop in the network layer is a virtual interface such as Logical IP Subnet in an IP over ATM, packets cannot be transferred at high speed because a table retrieval must be performed for a call sent from a destination at a packet transmission time. The reason is that packets cannot be transmitted if, in the routing process by a virtual interface, an interface to which a packet is transmitted is not determined and a call connected with the next hop over a packet relay route is not retrieved. In other words, packets cannot be transferred at high speed because the virtual interface must first be set up, and then the call must be retrieved for transfer. The second problem is that, in a connection oriented-type communication lip IP over ATM, a connection is established by originating a call on a packet trunk line to the next hop when packet relaying (i.e., through the ATM network) is necessary, but the call is disconnected when packet relaying is unnecessary. In that case, the address table can not deal with the change in the call state at the ATM side to delete the entry for the disconnected call because the retrieval key for the table is the transmission source address and the destination address in the network layer.

SUMMARY OF THE INVENTION

The present invention is made to solve the above-mentioned problems. The objective of the present invention is to provide a route that executes a high-rate packet transfer process with an address table while a virtual interface is being used, so that the conventional routing process can be omitted.

Another objective of the present invention is to provide a routing method that executes a high-rate packet transfer process with an address table while a virtual interface is being used.

The objective of the present invention is achieved by a route that operates in an ATM-LAN environment which implements RCF1577 "Classical IP and ARP over ATM" (hereinafter referred to as IP over ATM) and has virtual interfaces, the route having an address table in which a record is created for a message at the time the first packet in the message is transmitted. The record is comprised of a destination address in the network layer, an address of a next hop on a packet relay route (or simply a network layer destination address when a packet can be directly transmitted to its destination without a next hop), and additional packet transmission information.

The additional packet transmission information comprises the of a packet a destination address of a network layer and an address of a next hop at a packet transfer time, a header of a data link layer and a transmission destination interface when a packet is to be transmitted to a LAN interface, and call information on an ATM side when the packet is to be transmitted to an ATM interface. As a result, subsequent packets in a message are directly transmitted to a physical interface using information in the record created in the address table when the first packet in the message was transmitted, without executing a routing process.

In the route, the address table also stores an aging timer for aging a table entry. The address table is retrieved by using as a search key a destination address of a network layer. An address table entry is removed by using as a search key the address of a next hope of a network layer. The address table stores a record including the address of a next hop and packet transfer information by using as a search key a destination address of a network layer.

Moreover, according to the present invention, a routing method suitable for a route that operates in an ATM-LAN environment which implements and has virtual interfaces, comprises the steps of preparing an address table in which entries, each comprised of a destination address of a network layer, address of a next hop on a packet relay route (a destination address of a network layer when a packet can be directly transmitted), and packet transmission information are stored, retrieved, and removed as single units. The packet transmission information of each entry includes a destination address of a network layer and a address of a next hop at a packet transfer time, a header of a data link layer and a transmitted interface when a packet is transmitted to a LAN interface, and call information at an ATM when a packet is transmitted to an ATM interface, and directly transmitted a packet to a physical interface using the address table storing the packet transmitted from each interface, without executing a routing process.

The routing method further comprises the step of omitting a routing process when packet transfer information is obtained by retrieving the address table and performing a conventional routing process when packet transfer information is not obtained by retrieving the address table.

In the routing method, the routing process omitting step comprises the steps of executing LLC (Logical Link Control) Encapsulation when an interface to which a packet is transmitted is an ATM interface, as a result of packet transmitting information, and directly transmitting packets to the ATM interface based on VPI/VCI of packet transfer information.

The routing method further comprises the step of performing an address entering process, in addition to a conventional routing process, when packet transfer information is not obtained by retrieving the address table.

The routing method further comprises the steps of retrieving an ATMARP table of a virtual interface obtained by the routing table retrieval when an interface to which a packet is transmitted is an ATM interface, issuing a connection open request according to the content of an entry of the ATMARP table when the ATMARP table exists, and issuing a connection open request after the ATMARP process when no ATMARP table exists.

According to the present invention, where a virtual interface is used, packets can be effectively transferred at a high speed by entering call information into an address table and using it for the routing of packets.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below in detail with reference to the attached drawings.

Figure 1:
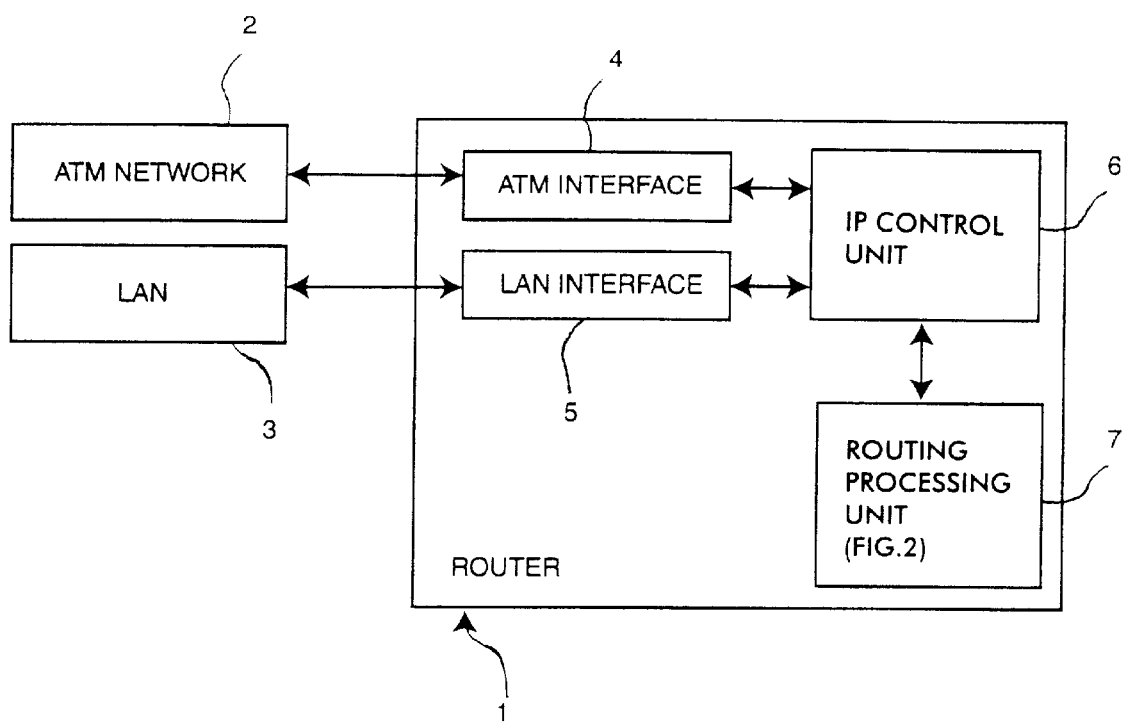
FIG. 1 is a block diagram illustrating a route including virtual interfaces according to the present invention.

FIG. 1 is a block diagram showing the system including an ATM network 2 and a LAN (Local Area Network) 3, and a route having virtual interfaces according to the present invention. Referring to FIG. 1, the route 1 consists of an ATM interface 4 for transmitting packets to the ATM network 2, a LAN interface 5 for transmitting packets to the LAN 3, an IP (Internet Protocol) control unit 6 for executing an Internet Protocol process, and a routing processing unit 7.

Figure 2:
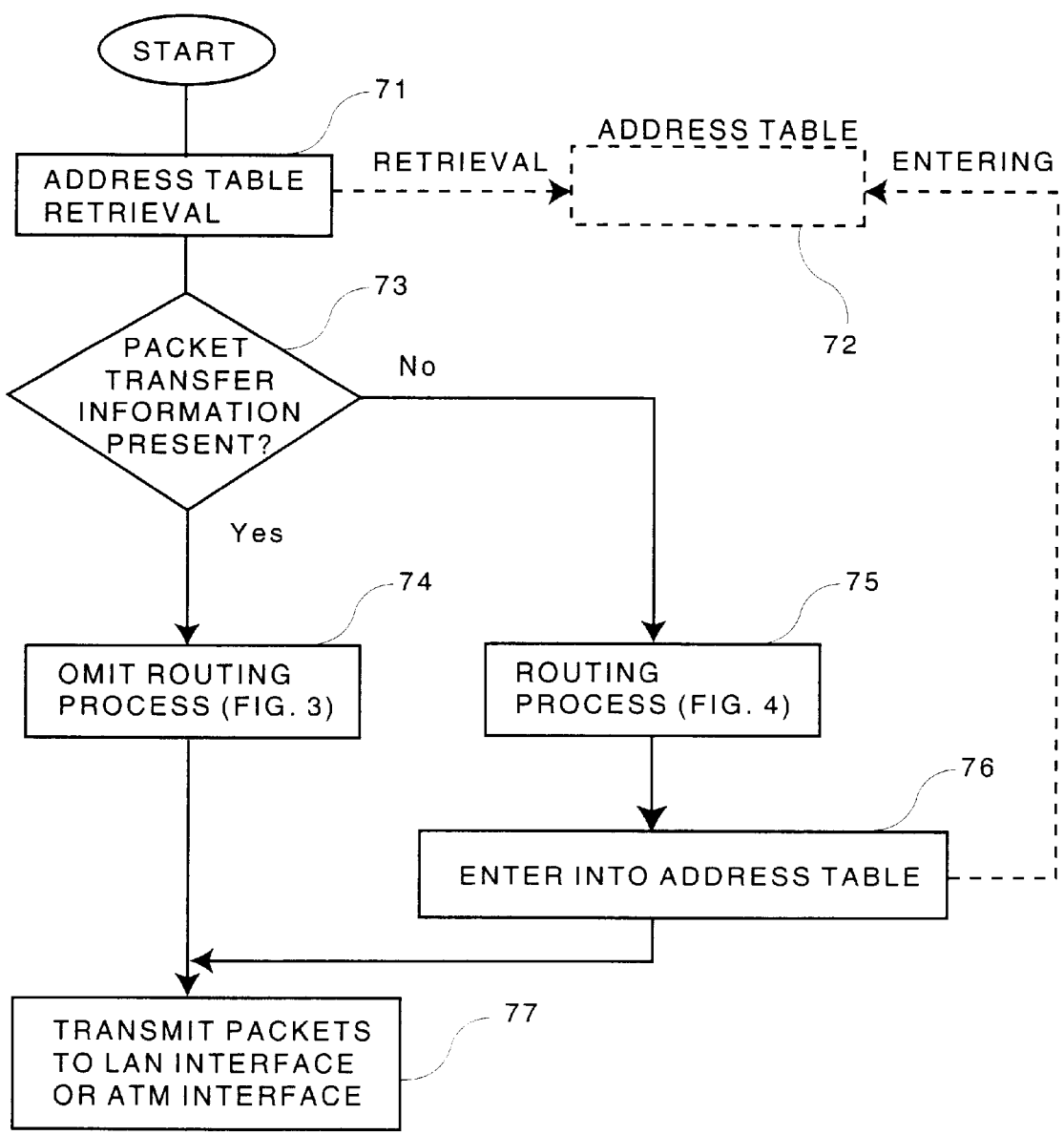
FIG. 2 is a flowchart for a routing processing unit in the route according to the first embodiment of the present invention.
Figure 3:
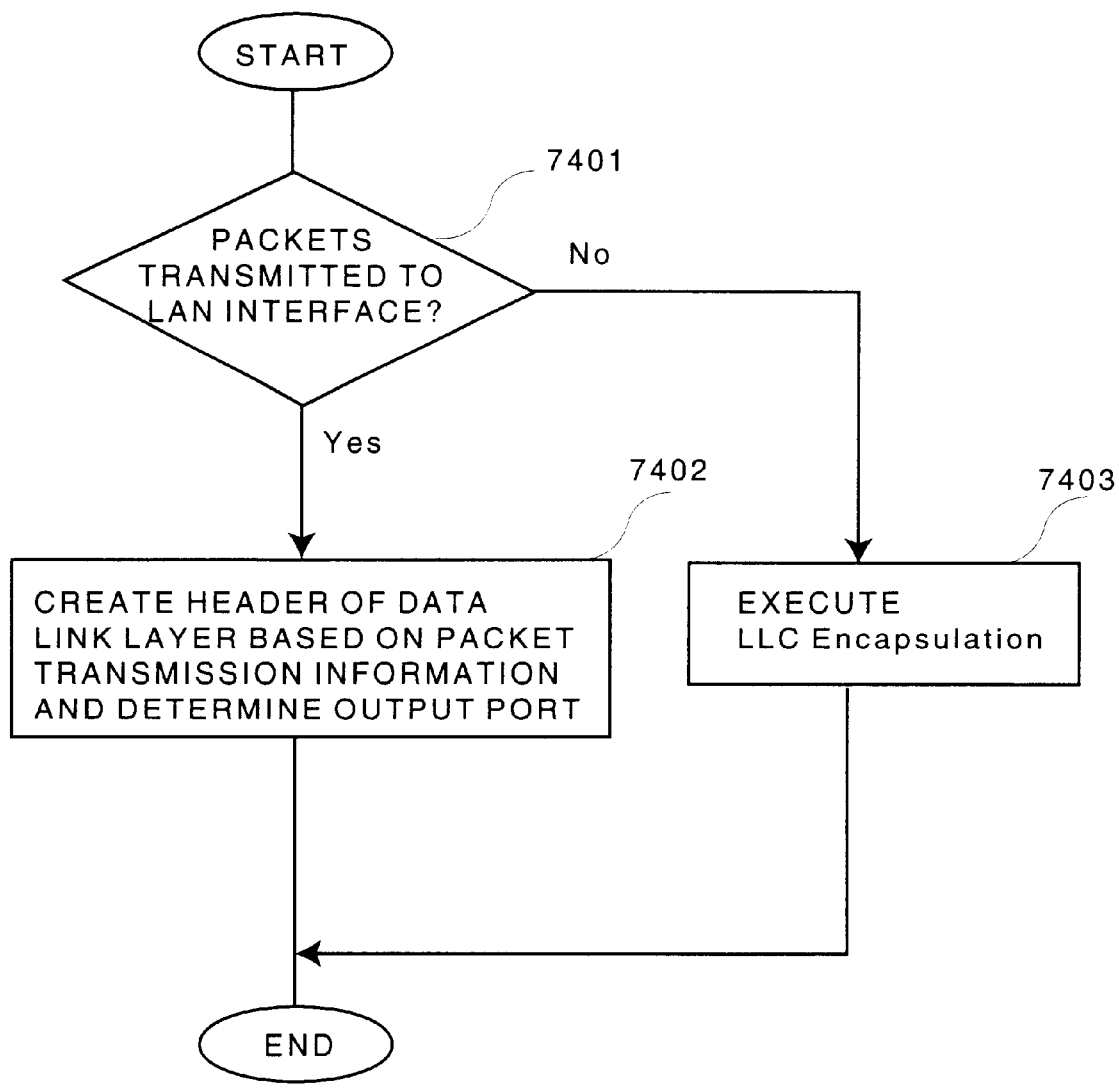
FIG. 3 is a flowchart at a routing process omission mode according to the present invention.
Figure 4:
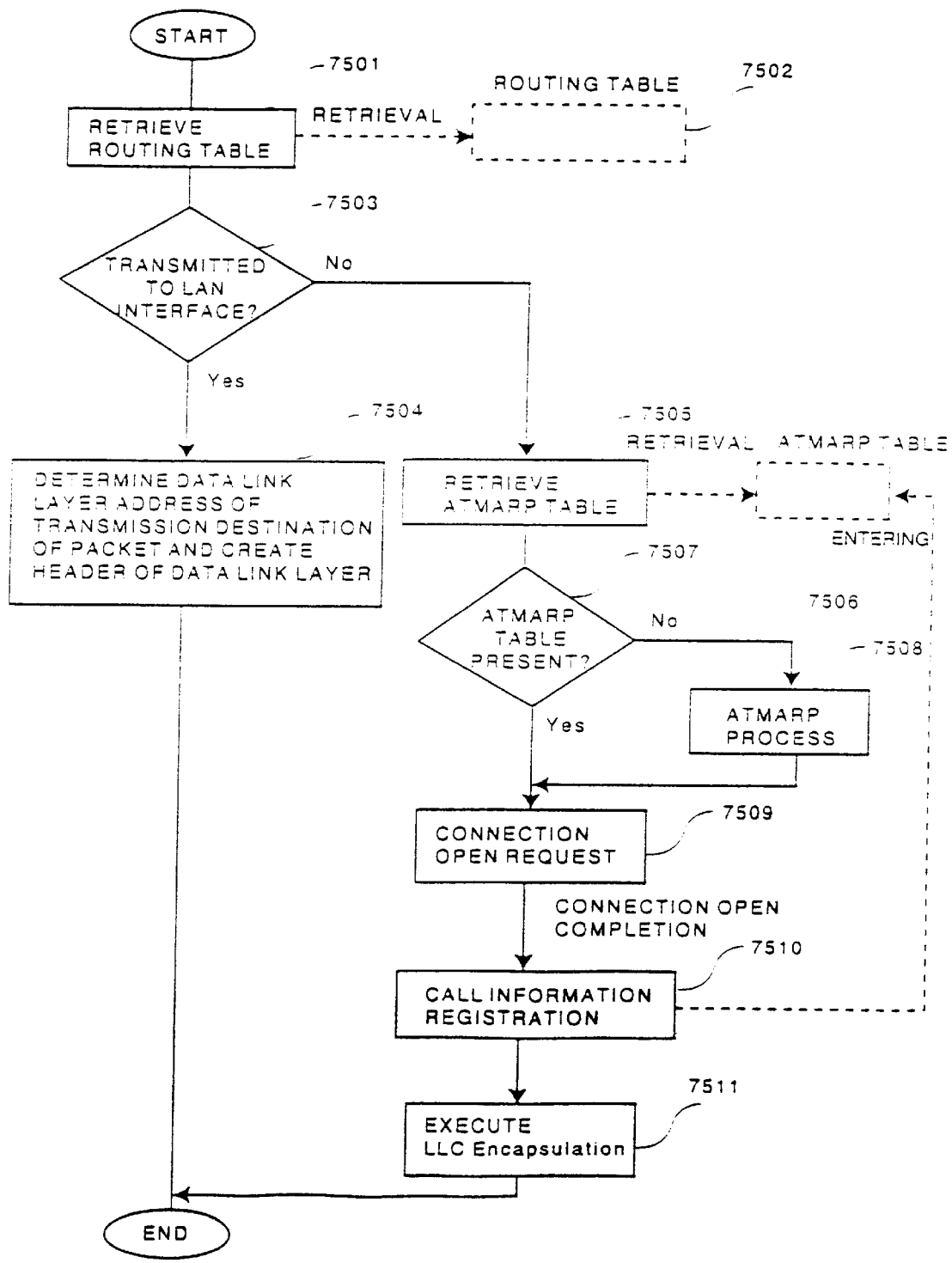
FIG. 4 is a flowchart for a conventional routing process in a route.

FIG. 2 is a function process flow of the routing processing unit 7 shown in FIG. 1. FIG. 3 is a process flow in the routing process omission mode. FIG. 4 is a conventional routing process in a route.

In the routing processing unit 7, the records entered in address table (72) are comprised of a destination address and an address of the next hop in the network layer, each being a search key thereof, (a destination address of a network layer when a packet can be directly transmitted), and an aging timer for aging packet transfer information and table entries. When packets are transmitted to the LAN interface, the table stores the header of a data link layer and a transmitted destination interface. When packets are transmitted to an ATM interface, the table stores call information (VPI (Virtual Path Identifier)/VCI (Virtual Channel identifier)) to be transmitted.

An address table entry is retrieved by using as a search key a destination address of a network layer. When an entry coinciding with a search key exists, packet transfer information is returned. When an entry coinciding with a search does not exist, an absence indicating signal is returned.

An address table entry is removed by using as a search key the address of a next hop of a network layer. When an entry coinciding with a search key exists, packet transfer information is returned.

A set of the address of a next hop and packet transfer information is entered into the address table by using as a search key a destination address of a network layer. If the entry coinciding with the search key does not exist, the entering process is not performed. When no empty entry which can be newly entered exists, the oldest entry is removed by judging from the timer value of the aging timer. Then new entries are entered.

The method according to the present invention does not relate to the method of creating and updating the routing table (7502) and the ATMARP (Asynchronous Transfer Mode Address Resolution Protocol) table (7506) used with the IP over ATM function. Hence the detail description will be omitted here.

The operation of the embodiment of the present invention will be described below with reference to FIGS. 1 to 4. 9-106014 filed on Apr. 23, 1997 including specification, claims, drawing and summary are incorporated herein by reference in its entirety.

The IP control unit 6, shown in FIG. 1, executes an Internet Protocol process of all relay packets.

Upon completing an Internet Protocol process, the routing processing unit 7 executes the address table retrieval (71) by using as a key a destination address of a network layer. As a result of the retrieval, if packet transfer information is obtained, the routing process (74) is omitted, and the steps in FIG. 3 are performed. If packet transfer information is not obtained, the conventional routing process (75) shown in FIG. 4 is performed.

As a result of referring to packet transfer information in the step of omission of the routing process (74), when an interface to which a packet is transmitted is an ATM interface, packets are directly transmitted to the ATM interface based on VPI/VCI of packet transfer information by executing LLC (Logical Link Control) Encapsulation (7403) (an encapsulating method of carrying packets for ATM AAL5).

Next, the method of forwarding packets to virtual interface will be described below.

When packet transfer information is not obtained, an address table entering process (76) is carried out in addition to the conventional routing process (75).

The routing table retrieval (7501), shown in FIG. 4, is executed at a destination address of a network layer. The case where the interface to which a packet is transmitted is a LAN interface (represented by step 7504 in FIG. 4) is identical to that in the conventional art (disclosed in JP-A-152655/1994). Hence, the duplicate will be omitted. Where an interface to which a packet is transmitted is an ATM interface, the ARMARP table entry (7506) of a virtual interface obtained by the routing table retrieval (step 7501) is retrieved (7505). Where the ATMARP table entry exists, a connection open request (7509) is issued according to the content of the ATMARP table entry. When no ATMARP table entry exists, a connection open request is issued after the ATMARP process (step 7509). At the time the connection has been opened, call information is entered into the ATMARP table (7506). An entry is entered into the address table (972) in the address table entering step (76) shown in FIG. 2.

With an entry now available in address table 72, a positive result is available at step 73, and the packet is transferred in the routing omission step (74) shown in FIG. 3.

Where the connection is freed in a call aging process by IP over ATM, a coincidence entry is removed from the address table (72) by using as a key the address of a next hop of a network layer, to deal with a change in call state on the ATM side.

Where an interface to which a packet is transmitted is an LAN interface, the packet transfer process is identical to that in the conventional art (JP-A-152655/1944).

The present invention relates to a route that implements IP over ATM and that operates in an ATM-LAN environment having a virtual interface. According to the present invention, even when a virtual interface, like Logical IP subnet of IP over ATM, has to transmit a call to a next hop in the network layer, the packet transfer can be implemented, with the routing process of successive packets eliminated, by registering call information of the virtual interface into a table at the time the first packet is transferred. This feature allows the processing capability of the route to be improved.

The reason is that, by registering the address of the next hop in the network layer into the address table, the present invention can deal with call information of a virtual interface.

Moreover, even in the connection oriented communication, like IP over ATM, where connection is established by originating a call with the next hop on a packet trunk line when the packet relaying is necessary and a call is broken when the packet relaying is unnecessary, the present invention can deal with a change in the call state by registering the address of the next hop in the network layer into the address table. Therefore, the packet transfer can be executed by referring to the address table, with the routing process eliminated. Thus, a call is managed for every address of the next hop on a trunk line, and an entry can be deleted from the address table using as a key the address of the next hop even if a call is disconnected.

The entire disclosure of Japanese Patent Application No. What is claimed is:

1. A router that operates in an ATM-LAN environment to implement classical IP and ARP over ATM, and having virtual interfaces, the router including an address table in which a record is created for a message at the time an initial packet in a message is transmitted, the record being comprised of fields for a destination address in the network layer, a network layer address of a next hop on a packet relay route and additional packet transmission information, the additional packet transmission information representing a header of a data link layer and a transmission destination interface when a packet is to be transmitted to a LAN interface, and call information on an ATM side when the packet is to be transmitted to an ATM interface, the router being operative to transmit a packet directly to a physical interface using information stored in the address table without executing a normal routing process for packets subsequent to the initial packet.

2. The router defined in claim 1, wherein each address table record includes a field that stores an aging timer for the record.

3. The router defined in claim 1, wherein address table records are retrieved using the network layer destination address field as a search key.

4. The router defined in claim 1, wherein address table records are removed using the network layer next hop address field as a search key.

5. The router defined in claim 1, wherein address table records are stored using the network layer destination address field as a search key.

6. A routing method for implementing classical IP and ARP over ATM in an ATM-LAN environment having virtual interfaces, comprising:

creating an address table for storing message routing information records, the records being comprised of fields for a network layer destination address, a network layer address of a next hop on a packet relay route and additional packet transmission information, the additional packet transmission information representing a header of a data link layer and a transmission destination interface when a packet is to be transmitted to a LAN interface, and call information on an ATM side when the packet is to be transmitted to an ATM interface;

creating a record for a message at the time an initial packet in the message is transmitted; and transmitting a packet directly to a physical interface using information stored in the address table without executing a normal routing process for packets subsequent to the initial packet.

7. A routing method as defined in claim 6, further comprised of omitting the routing process when packet transfer information is obtainable from the address table and performing a conventional routing process when packet transfer information is not obtainable from the address table.

8. The routing method as defined in claim 7, wherein the routing process further includes, when packet transfer information is not obtainable from the address table:

executing Logical Link Control Encapsulation when an interface to which a packet is transmitted is an ATM interface; and directly transmitting packets to the ATM interface based on VPI/VCI information obtained from the address table.

9. The routing method defined in claim 6, further comprising the step of performing an address entering process, in addition to a conventional routing process, when packet transfer information is not obtained by retrieving said address table.

10. The routing method defined in claim 6, further comprising the steps of retrieving an ATMARP table of a virtual interface obtained by the routing table retrieval when an interface to which a packet is transmitted is an ATM interface, issuing a connection open request according to the content of an entry of the ATMARP table when the ATMARP table exists, and issuing a connection open request after the ATMARP process when no ATMARP table exists.

* * * * *